3,434,096
COUPLING
Anthony J. Pusateri, Jr., Canoga Park, Calif., assignor to Lockheed Aircraft Corporation, Burbank, Calif.
Filed Apr. 17, 1967, Ser. No. 631,514
U.S. Cl. 339—44     8 Claims
Int. Cl. H01r *13/44, 13/54;* F16l *37/20*

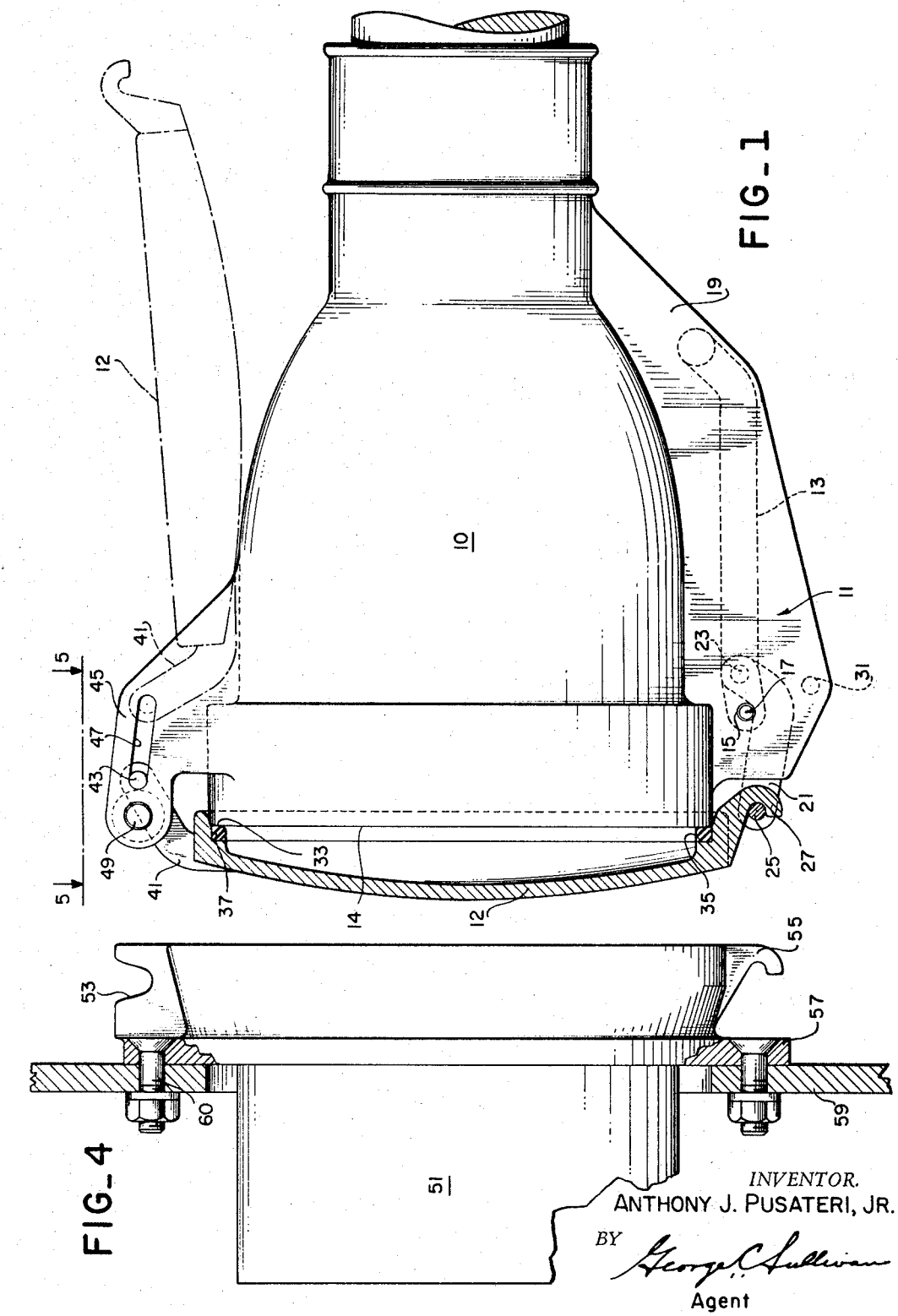

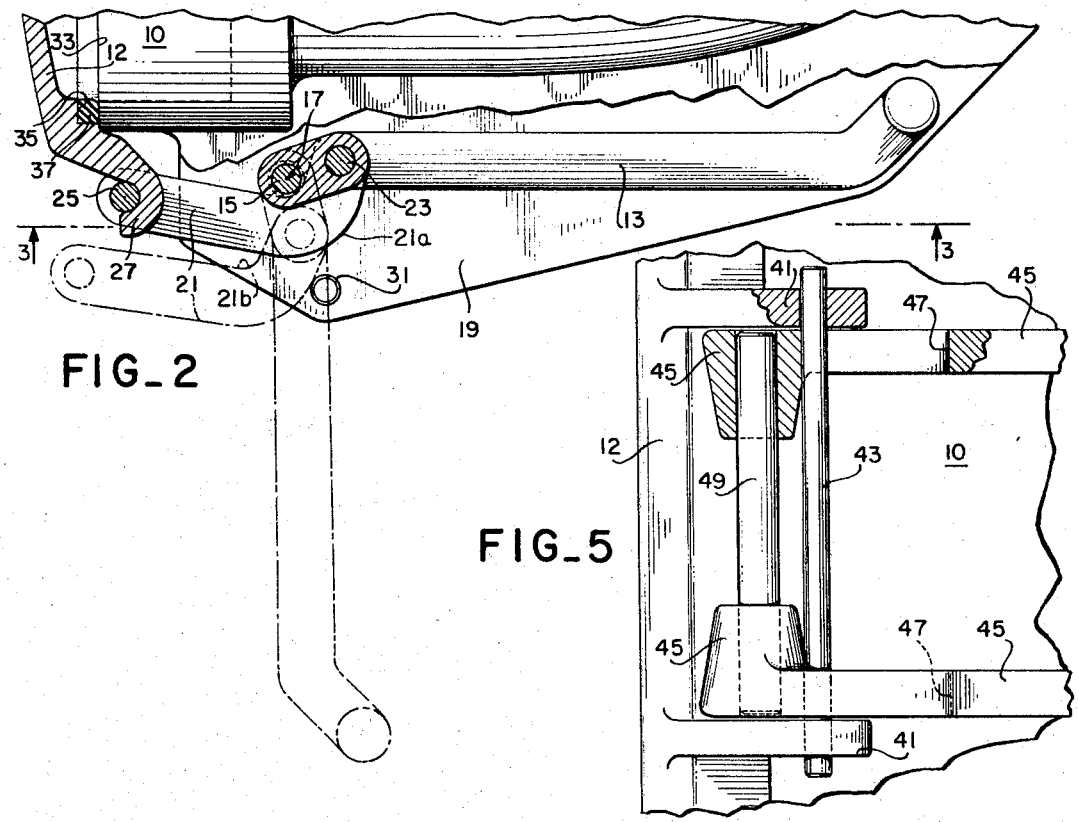
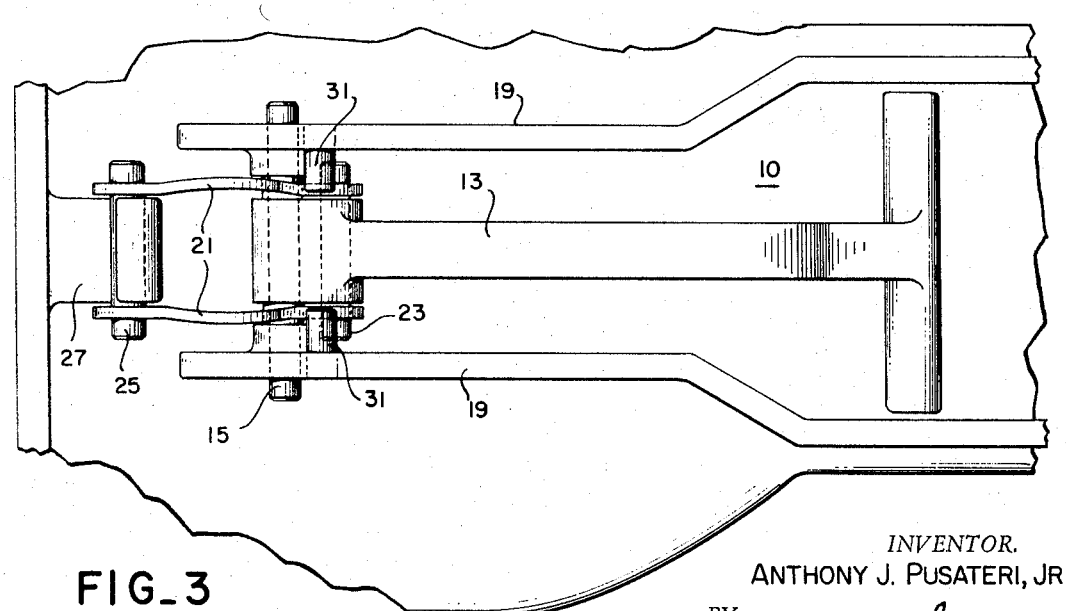

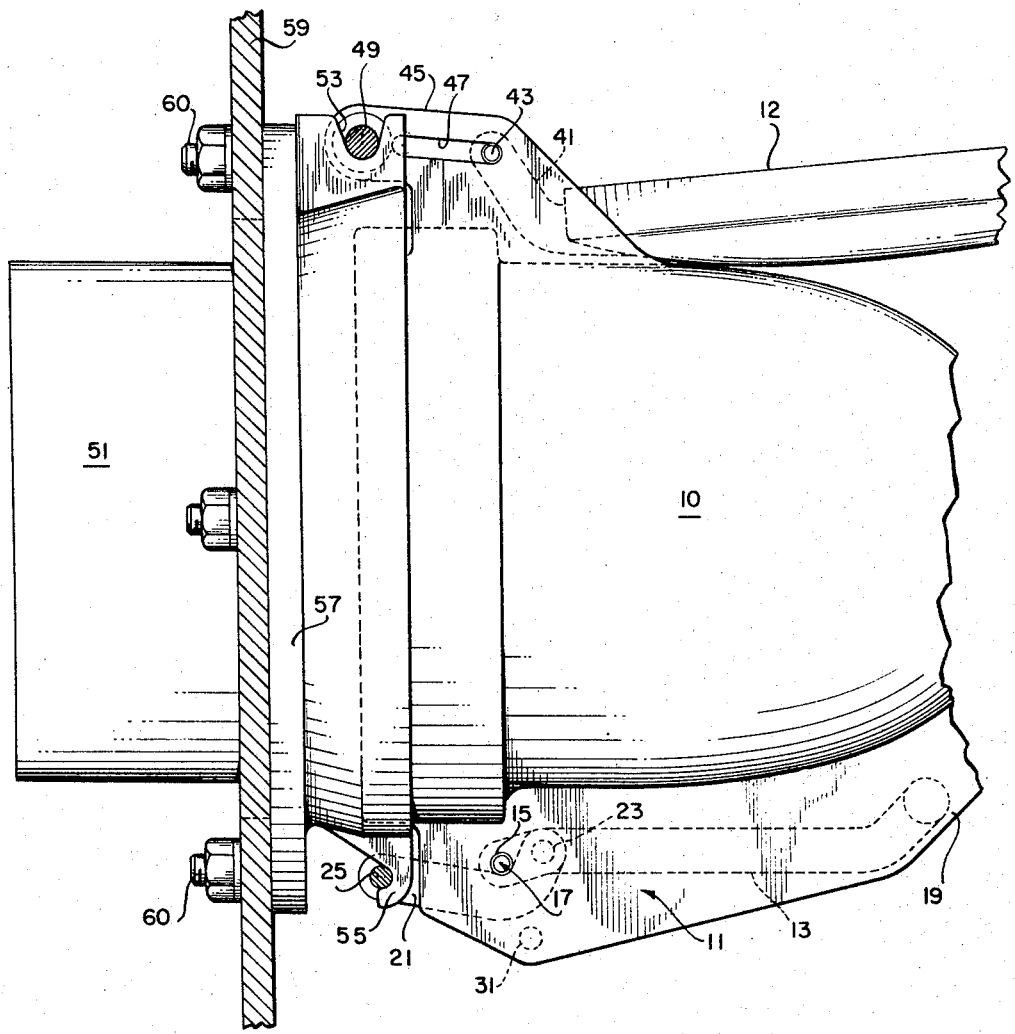
FIG_6

ABSTRACT OF THE DISCLOSURE

A coupling adapted for removably connecting a first structural member to a second structural member is defined by this invention. It includes a latch mechanism on the first structural member for automatically engaging and locking the two members in a desired relationship. The latch mechanism comprises a lever and a connecting link coacting as an over-center device with cam means for guiding the connecting link into engagement with a catch on the second structural member.

BACKGROUND OF THE INVENTION

Field of the invention

This invention relates to a coupling and more particularly to a latch mechanism for removably connecting a first structural member to a second structural member. Although the coupling may be used to connect any two members, such as a hose to a hydrant, or a pipe to a fitting, for purposes of illustration, it is specifically described herein in conjunction with an electrical plug adapted for attachment to a receptacle. The usual plug with which this connector is used is of a relatively large size. For example, the plug is often connected to a trunk line having a diameter of several inches. Plugs of this type usually employ coupling means having conventional over-center latch mechanisms. Each of these latch mechanisms has a lever which pivots about an axis and a link member having one end pivotally connected to the lever to travel in an arc about the lever axis, and another end adapted to be connected to a catch mechanism.

Description of the prior art

Heretofore difficulties have been encountered in installing such plugs. In many cases, it has been necessary that two men accomplish this installation, one man holding the trunk line while the other used both hands in manipulating the coupling's latch mechanism; one hand being used to operate the handle while the other hand was engaged in manipulating the link member. Also, after the plug was installed, its face would be loosely fitted with the face of the receptacle and in such a condition there was a danger of arcing occurring, thereby causing a short circuiting of the line. Such dangers were increased in a watery or a damp environment where moisture could leak into the interior of the plug to damage the electrical connections. Also, in many instances, such a plug was not provided with a cover means to protect its conductors against damaging elements. This resulted in a tendency to contaminate or rust the conductors during periods when the plug was not in use.

SUMMARY OF THE INVENTION

This invention includes a coupling for removably connecting a first structural member to a second structural member. The coupling includes a latch mechanism that can be easily manipulated with one hand when connecting or disconnecting the two members. The latch mechanism comprises: a lever pivoting about an axis; a connecting link, pivotally connected to the lever, adapted for engagement with a catch device; and cam means for automatically guiding the connecting link into engagement with the catch, upon movement of the lever. Various other advantages will appear from the following description of one embodiment of the invention.

BRIEF DESCRIPTION OF THE DRAWINGS

FIGURE 1 is a sectional plan view of a plug with a protective cover plate being attached thereto;

FIGURE 2 is a plan view of the latch mechanism shown in FIGURE 1 partially cut away;

FIGURE 3 is a sectional view of the latch mechanism taken along the lines 3—3 in FIGURE 2;

FIGURE 4 is a sectional view of the receptacle;

FIGURE 5 is a partial plan view of another section of plug and cover plate as shown in FIGURE 1; and FIGURE 6 is a section plan view of the plug being attached to the receptacle.

DETAILED DESCRIPTION

In the illustrated embodiment of the invention, FIGURE 1 shows a plug body generally indicated at 10 and usually referred to hereinafter as a plug. This plug is provided with a latch mechanism generally indicated at 11. A cover plate 12 is located over the plug face 14 and is adapted to be removed when the plug 10 is ready for use. The latch mechanism 11, shown in detail in FIGURES 2 and 3, includes a lever 13 pivotally connected through pin 15 to the main housing flanges 19 which extend from the surface of the plug 10, the lever 13 pivoting about axis 17. A pair of links 21 having a cam surface 21a and a bearing surface 21b is pivotally connected to the lever 13 by means of a connecting pin 23. In the locked position (shown by the solid lines in FIGURE 2) the pins 15 further act as a stop which limits the upward movement of the links 21. Located at the other end of each of the links 21 is a connecting bar 25 which connects the two links 21. The connecting bar 25 is adapted to be inserted into a hook member 27 of the cover plate 12. A pair of stops 31 extend inwardly from the main housing flanges 19 to act as a stop and cam member for the links 21. The end face 14 of the plug 10 is provided with a rim 33 over which the cover plate 12 extends. The mutually engaging portion of the cover plate 12 is provided with an annular groove 35 which houses an annular seal 37. When the cover plate 12 is attached to the plug face 14, the annular seal 37 bears against the rim 33 in a sealed position.

The upper portion of the cover plate 12 is provided with a pair of flanges 41. These flanges 41 are pivotally connected to a pair of boss members 45 of the plug 10 by means of a pin 43. The pin 43 extends into a pair of slots 47 of the boss members 45, the reasons for which will be discussed in greater detail hereinafter.

FIGURE 4 shows a receptacle 51 to which the plug 10 is adapted to be attached. The receptacle 51 includes a notch 53 located on the upper portion of the receptacle housing and a hook member 55 located on the lower portion of the receptacle housing. A flange portion 57 of the receptacle 51 is connected to a wall 59 by means of bolt 60.

FIGURE 5 shows a hinge pin 49 located between the pair of boss members 45. The hinge pin 49 is adapted to be inserted into the notch 53 on the receptacle 51 while the connecting bar of the latch mechanism 11 is adapted to be inserted over the hook portion 55 of the receptacle 51.

FIGURE 6 shows the plug 10 and the receptacle 51 combination in its attached position.

The operation of the link mechanism is described in conjunction with FIGURE 2, with the locked position shown in solid lines and the open position of the lock mechanism shown in broken lines. To open the latch mechanism by disengaging the connecting bar 25 from the hook member 27, the lever 13 is pivoted around the pin axis 17. The connector pin 23 of the pair of links 21 then travels in an arc about the same axis from its over-center position. The other ends of links 21 then move in a direction away from the hook member 27 until the bar 25 is disengaged from the hook member 27. When this occurs the bar 25 and the links 21 are free to fall away from the hook member 27 by their own force of gravity. The pair of stops 31 hold the pair of links 21 from any further downward movement. The cover plate 12 is then released from the latch mechanism and is pivoted about the pin 43 in slot 47 and comes to rest on the top portion of the plug 10 at the end of the slot furthest away from the hinge pin 49. The slots 47 are provided to remove the cover plate 12 from possible interference with the hinge pin 49 while it is being inserted over the notch 53 of the receptacle 51. The plug 10 is now ready to be attached to the receptacle 51. In this operation the hinge pin 49 of the plug 10 is placed into the notch 53 of the receptacle 51. The face of the plug 10 is then pivoted to an adjacent position against the face of the receptacle 51. The closing procedure of the latch mechanism 11 is again described in conjunction with FIGURE 2. The lever 13 is raised from its vertical position to the horizontal position by pivoting it around the axis 17. The connector pin 23 of the pair of links 21 then pivots in an arc about the same axis 17. However, the cam surface 21a of each of the links 21 bears against the pair of cams 31, which enables the pair of links 21 to slidingly rotate about the cams 31. By this rotating movement the connecting bar 25 (as seen in FIGURE 2) is rotated in a clockwise direction and is caused to travel upward and rearward into engagement with the hook member 55. After the connecting bar 25 is fully extended into the hook member 55, the pair of links 21 pivots about the pin axis of the connecting bar 25 responsive to the continued movement of the lever 13. The connector pin 23 continues to move about the pin axis 17 along with the lever 13 until the lever is in its horizontal position and the bearing surface 21b of the links 21 bear against the pins 15. At the point the links 21 are in their over-center position, whereupon the latch mechanism is again tightly secured. The process for releasing the plug 10 from the receptacle 51 and attaching the cover plate 12 follows the same procedure in reverse as described above.

The pair of links 21 are normally bowed outward to an extent greater than shown in FIGURE 3. Their engagement with the hook member 27 and the described handle movement results in their elongation and an inward movement of the bowed sections. Hence, because of their inherent spring tension they are in fact a pair of leaf springs. These leaf springs, while accommodating reasonable tolerance conditions in the connecting members also maintain a tension in the latch mechanism when the latch is in its locked position, tending to maintain the over-center locked condition of the latch. It may plainly be seen, however, that the latch mechanism 11 can be locked and unlocked relatively easily. In using this latching means, only one hand is needed to operate the lever 13, while the links 21, guided by the cam 31, function automatically. This insures that the connecting bar 25 will always engage the respective hook member when the latch member is tightened.

The existence of the flanges 19, while not being mandatory except for the retention of the pin 15, provides a guard region within which the lever 13 rests when latched, thereby preventing its undue exposure to being inadvertently engaged and rotated to an unlocked position.

In the illustrated embodiment of the invention, when the latch mechanism is opened the links 21 fall by their own force of gravity. This is because the latch mechanism is on the bottom portion of plug 10; however, if the latch mechanism were placed in any other attitude, some conventional spring means would be needed to force the pair of links 21 out of engagement with the hook portion.

It will be understood that various changes in the details, materials, steps and arrangements of parts which have been herein described and illustrated in order to explain the nature of the invention may be made by those skilled in the art within the principal and scope of the invention.

I claim:

1. A latch mechanism for removably connecting a first structural member to a second structural member comprising:
    an actuating lever pivotally connected to the first structural member for rotation about pin means having a fixed axis;
    a catch located on the second structural member, the pin means and the catch having a centerline extending therethrough;
    link means, one end being pivotally connected to the lever for rotation about a pivot point, and the other end adapted to engage the catch on the second structural member, the link means further having a camming surface and a bearing surface, the pin means being located for engaging the bearing surface of the link means when the pivot of the link means is on one side of the centerline; and
    cam means attached to the first structural member for slidably engaging the camming surface of the link means when the pivot point of the link means is on the other side of the centerline, the cam means coacting with the camming surface in such a manner that upon movement of the lever to the one side of the centerline, the one end of the link means travels in an arc about the lever axis, and the other end of the link means travels in an arc in the direction of the catch to be engaged therewith.

2. The invention in accordance with claim 1 wherein the link means includes a leaf spring.

3. The invention in accordance with claim 1 wherein the link means is a pair of leaf springs maintaining a tension during latch engagement, each having one end pivotally connected to the lever and the other end adapted to be engaged with the catch on the second member.

4. The invention in accordance with claim 1 wherein the link means includes:
    a pair of leaf springs having one end pivotally connected to the lever; and
    a bar attached to the other ends of each of the leaf springs, the bar being adapted to be engaged to the catch on the second member.

5. The invention in accordance with claim 4 wherein the cam means includes a pair of pins attached to the first member, each pin slidably engaging the camming surface of a corresponding leaf spring.

6. A coupling device for removably connecting a connecting member to a receptacle comprising:
    a latch mechanism located on one side of the connecting member;
    hinge means located on the opposite side of the connecting member;
    notch means located on one side of the receptacle adapted to receive the hinge means of the connecting member;
    catch means located on the other side of the receptacle adapted to be engaged to latch mechanism of the connecting member;

a cover plate pivotally connected to opposite side of the connecting member, the cover plate having a catch means adapted to be engaged to the latch mechanism on the one side of the connecting member; and slot means provided in said connecting member hinge means to receive said pivotal connection of said cover so as to permit said pivotal connection to slide within said slot means for cover stowage purposes.

7. The invention in accordance with claim 6 wherein the latch mechanism includes:

an actuating lever adapted to be pivotally connected to the connecting member, the lever pivoting about an axis;

link means, one end of which is pivotally connected to the lever, the other end of which is adapted to be engaged to the catch on the receptacle, the link means further having a camming surface; and cam means attached to the connecting member for slidably engaging the camming surface of the link means, and coacting with the camming surface in such a manner that upon movement of the lever, the one end of the link means travels in an arc about the lever axis, and the other end of the link means travels in an arc in the direction of the catch to be engaged therewith.

8. The invention in accordance with claim 6 wherein the connecting member is an electrical plug and the receptacle is an electrical plug receptacle.

References Cited

UNITED STATES PATENTS

| 778,557 | 12/1904 | Szepe | 285—311 |
| 1,804,908 | 5/1931 | Wichert | 339—44 |
| 2,700,141 | 1/1955 | Jones | 339—96 |

FOREIGN PATENTS

| 188,930 | 10/1907 | Germany. |
| 658,628 | 10/1951 | Great Britain. |
| 81,970 | 4/1919 | Switzerland. |

RICHARD E. MOORE, *Primary Examiner.*

JOSEPH H. McGLYNN, *Assistant Examiner.*

U.S. Cl. X.R.

339—75; 285—311